United States Patent [19]
Weintraub

[11] Patent Number: 5,842,163
[45] Date of Patent: Nov. 24, 1998

[54] METHOD AND APPARATUS FOR COMPUTING LIKELIHOOD AND HYPOTHESIZING KEYWORD APPEARANCE IN SPEECH

[75] Inventor: Mitchel Weintraub, Fremont, Calif.

[73] Assignee: SRI International, Menlo Park, Calif.

[21] Appl. No.: 660,144

[22] Filed: Jun. 7, 1996

Related U.S. Application Data

[60] Provisional application No. 60/000,379 Jun. 21, 1995.

[51] Int. Cl.⁶ .................................................. G10L 5/06
[52] U.S. Cl. ......................... 704/240; 704/231; 704/251; 704/255
[58] Field of Search ..................... 395/2.4, 2.45, 395/2.48, 2.49, 2.65, 2.66, 2.64; 704/231, 236, 239, 240, 256, 255, 257

[56] References Cited

U.S. PATENT DOCUMENTS 5,675,706  10/1997  Lee et al. .................................. 704/256
5,710,864   1/1998  Juang et al. .............................. 704/256

OTHER PUBLICATIONS

Weintraub, "Keyword–Spotting using SRI's DECIPHER Large–Vocabulary Speech–Recognition System," *Proceedings of the 1993 ICASSP Conference*, pp. II.463–II.466 (May 1993).

Rohlicek et al., "Continuous Hidden Markov Modeling for Speaker–Independent Word Spotting," *Proceedings of the 1989 ICASSP Conference*, pp. 627–630.

Rose et al., "A Hidden Markov Model Based Keyword Recognition System," *Proceedings of the 1990 ICASSP Conference*, pp. 129–132.

Weintraub, "LVCSR Log–Likelihood Ratio Scoring For Keyword Spotting," *Proceedings of the 1995 ICASSP Conference*.

Weintraub, "Keyword–Spotting Using SRI's Decipher™ Large–Vocabulary Speech Recognition System," *Proceedings of 1993 ICASSP Conference*.

Primary Examiner—David R. Hudspeth
Assistant Examiner—Susan Wieland
Attorney, Agent, or Firm—Townsend and Townsend and Crew LLP; Kenneth R. Allen

[57] ABSTRACT

In a method for determining likelihood of appearance of keywords in a spoken utterance as part of a keyword spotting system of a speech recognizer, a new scoring technique is provided wherein a confidence score is computed as a probability of observing the keyword in a sequence of words given the observations. The corresponding confidence scores are the probability of the keyword appearing in any word sequence given the observations. In a specific embodiment, the technique involves hypothesizing a keyword whenever it appears in any of the "N-Best" word lists with a confidence score that is computed by summing the likelihoods for all hypotheses that contain the keyword, normalized by dividing by the sum of all hypothesis likelihoods in the "N-best" list.

14 Claims, 1 Drawing Sheet

METHOD AND APPARATUS FOR COMPUTING LIKELIHOOD AND HYPOTHESIZING KEYWORD APPEARANCE IN SPEECH

This invention was made under Contract No. MDA 904-93-C-4141 with The United States Government to SRI International of Menlo Park, Calif. The United States Government retains a nonexclusive, nontransferable license under any patent rights.

This application claims the benefit of U.S. Provisional Application No. 60/000,379, filed Jun. 21, 1995.

REFERENCES

1. V. Digalakis, and H. Murveit, "Genones: Optimizing the Degree of Mixture Tying in a Large Vocabulary Hidden Markov Model Based Speech Recognizer," 1994 *IEEE International Conference on Acoustics, Speech, and Signal Processing (ICASSP) Proceedings*, pp. I.537–I.540.
2. H. Murveit, J. Butzberger, V. Digalakis, and M. Weintraub, "Large-Vocabulary Dictation Using SRI's DECIPHER Speech Recognition System: Progressive Search Techniques," 1993 *IEEE ICASSP Proceedings*, pp. II.319–II.322.
3. H. Murveit, J. Butzberger, and M. Weintraub, "Performance of SRI's DECIPHER Speech Recognition System on DARPA's CSR Task," 1992 *DARPA Speech and Natural Language Workshop Proceedings*, pp 410–414.
4. H. Murveit, J. Butzberger, and M. Weintraub, "Reduced Channel Dependence for Speech Recognition," 1992 *DARPA Speech and Natural Language Workshop Proceedings*, pp. 280–284.
5. B. P. Landell, R. E. Wohlford, and L. G. Bahler, "Improved Speech Recognition in Noise," 1986 *IEEE ICASSP Proceedings*, pp. 749–751.
6. R. Rose and D. Paul, "A Hidden Markov Model Based Keyword Recognition System," 1990 *IEEE ICASSP Proceedings*, pp. 129–132.
7. R. Rohlicek, W. Russell, S. Roukos, and H. Gish, "Continuous Hidden Markov Modeling for Speaker-Independent Word Spotting," 1989 *IEEE ICASSP Proceedings*, pp. 627–630.
8. M. Weintraub, "Keyword-Spotting Using SRI's DECIPHER Large-Vocabulary Speech-Recognition System," 1993 *IEEE ICASSP Proceedings*, pp. II.463–II.466.
9. R. Schwartz, "Efficient, High-Performance Algorithms for N-Best Search," 1990 *DARPA Speech and Natural Language Workshop Proceedings*, pp. 6–11.
10. F. K. Soong, E. F. Huang, "A Tree-Trellis Based Fast Search for Finding the N Best Sentence Hypotheses in Continuous Speech Recognition," 1990 *DARPA Speech and Natural Language Workshop Proceedings*, pp. 12–19.
11. J. J. Godfrey, E. G. Holliman, and J. McDaniel, "SWITCHBOARD: Telephone Speech Corpus for Research and Development." 1992 *IEEE ICASSP Proceedings*, pp. I.517–I.520.
12. H. Murveit, P. Monaco, V. Digalakis, and J. Butzberger, "Techniques to achieve an accurate real-time large-vocabulary speech recognition system," 1994 *ARPA Human Language Technology Workshop Proceedings*, pp. 368–373.
13. Mitchel Weintraub, "LVCSR Log-Likelihood Ratio Scoring For Keyword Spotting," 1995 *IEEE ICASSP Proceedings*, pp. I.297–I.300.

BACKGROUND OF THE INVENTION

The invention relates to language recognition and more particularly to a system and method for improving the confidence score in keyword spotting in a large vocabulary continuous speech recognition (LVCSR) system. The confidence score is typically a log-probability score indicating the strength of belief that a keyword has appeared in a spoken utterance. Typically, if the confidence score exceeds a preset threshold, the keyword spotting system will declare that it has "detected" the appearance of the keyword. The threshold can be chosen as a tradeoff between false alarms and higher detection rate.

Efforts at keyword spotting typically employ various speech models, such as triphone acoustic models, bigram language models and nonkeyword background models. All need a confidence score as a metric. Previous metric generators have included log likelihood ratio (LLR) scoring techniques [References 5,6]. The advantage of such an approach is that the quality of the match to the data is not directly used, but the comparison is relative to how it matches other candidate hypotheses. However, such LLR scoring techniques only use acoustic information about the keyword hypothesis and are therefore somewhat limited.

Another approach to computing a keyword hypothesis score has been developed in [Reference 7]:

$$\text{Prob}(\text{State}_{Time=t}=\text{EndState}_{Keyword}|\text{Observations})$$

While this approach also has the potential for using a large-vocabulary continuous speech recognition approach, the scoring metric has several disadvantages. However, previous LLR scoring techniques are of only limited usefulness. If the last state does not match the data well, even though all other states have matched well, then this focus on how a word ends can degrade system performance.

One article explaining earlier work by the inventor was presented at the May 1993 International Conference on Acoustic Signals and Speech Processing (IEEE ICASSP) entitled "Keyword-Spotting using SRI's DECIPHER Large-Vocabulary Speech-Recognition System," *Proceedings of the 1993 ICASSP Conference*, pp. II.463–II.466 (May 1993) [i.e., Reference 8]. In earlier work on keyword spotting, the inventor used the Viterbi backtrace from a large-vocabulary continuous speech recognition (LVCSR) system. A keyword was hypothesized if it appeared in the Viterbi backtrace. Using the one best answer from the Viterbi backtrace, the inventor used the average probability per frame as the score for each hypothesized keyword.

This algorithm worked well for high frequency keywords, but was not able to generate the necessary false-alarms (when the recognizer inserts this keyword) needed to compute a receiver-operating curve (ROC).

To improve keyword spotting performance, it is desirable to increase the frequency that keywords are hypothesized. To complement this goal, a scoring algorithm should continue to reward hypotheses that are the best recognition hypothesis.

The score used for hypothesizing keywords in the earlier system was based on a duration normalized likelihood:

$$\text{Score}_{Keyword} \frac{\left|\begin{array}{c} \text{EndTime}_{Keyword} \\ \text{StartTime}_{Keyword} \end{array}\right.}{\text{EndTime}_{Keyword} - \text{StartTime}_{Keyword}}$$

Other useful background articles are [References 7,6].

What is needed are more accurate and efficient keyword spotting confidence measurement mechanisms.

SUMMARY OF THE INVENTION

According to the invention, in a method for determining likelihood of appearance of keywords in a spoken utterance as part of a keyword spotting system of a speech recognizer, a new scoring technique is provided wherein a confidence score is computed as a probability of observing the keyword in a sequence of words given the observations. The corresponding confidence scores are the probability of the keyword appearing in any word sequence given the observations. In a specific embodiment, the technique involves hypothesizing a keyword whenever it appears in any of the "N-Best" word lists with a confidence score that is computed by summing the likelihoods for all hypotheses that contain the keyword, normalized by dividing by the sum of all hypothesis likelihoods in the "N-best" list.

The invention will be better understood upon reference to the following detailed description in connection with the accompanying drawings.

DESCRIPTION OF SPECIFIC EMBODIMENTS

Figure 1:
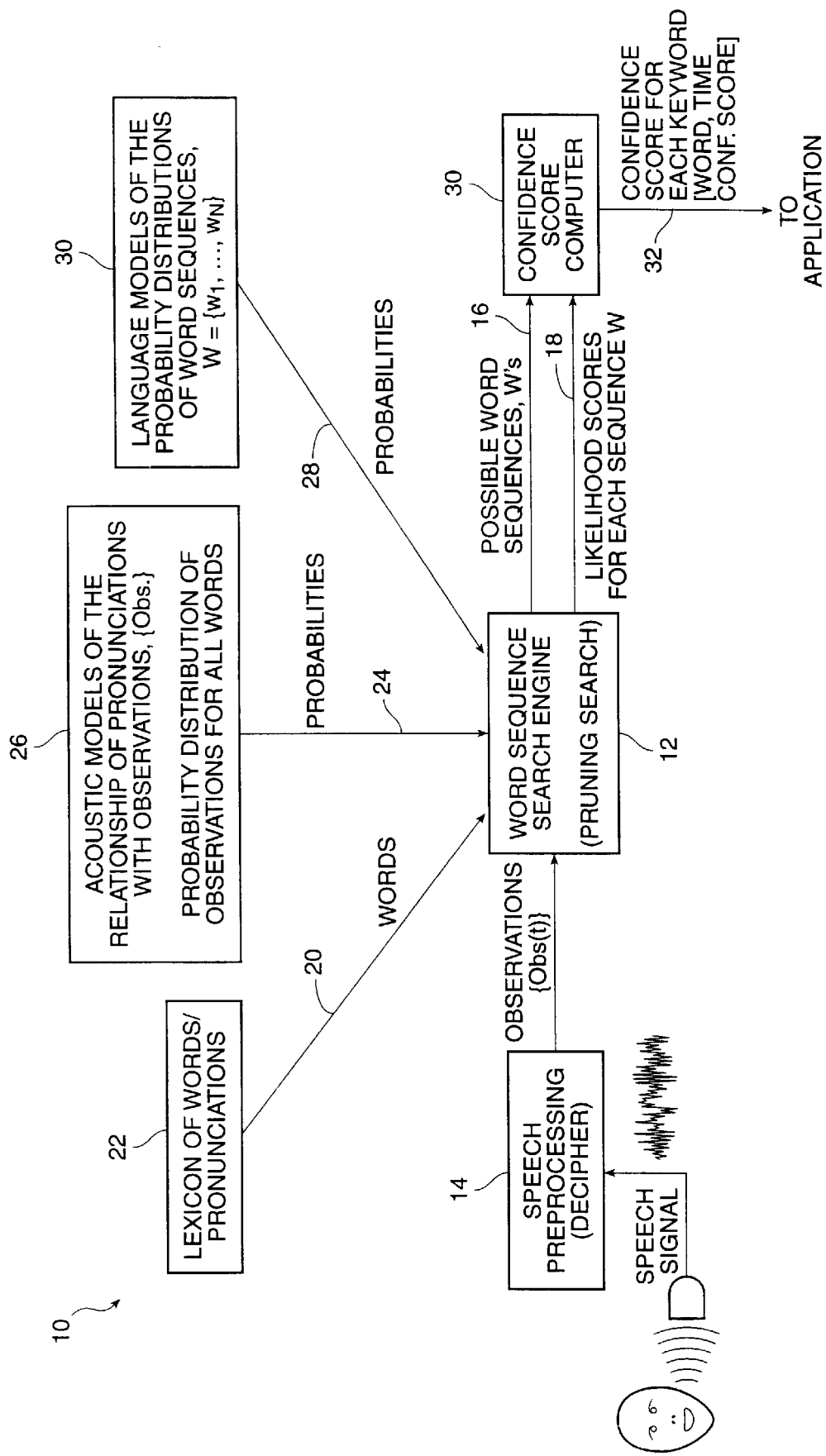
FIG. 1 is a block diagram of an apparatus operative according to the invention.

FIG. 1 is a block diagram of a keyword spotting confidence scoring apparatus 10 operative according to the invention. A key element is a search engine 12 which accepts observations from a speech preprocessor 14 (such as the DECIPHER™0 system of SRI International of Menlo Park, Calif.) and produces as output possible word sequences 16 and likelihood scores 18 corresponding to the "N-Best" word sequences, as hereinafter explained. The search engine 12 is supported by words 20 received from a lexicon 22 of words with possible pronunciations, as well as probability inputs 24 from acoustic models 26 of the relationship of pronunciations with observations. (These models are expressed as a probability distribution of observations for all phones including "words".) Support is also provided according to the invention from probability inputs 28 from language models 30 of the probability distribution of word sequences expressible for example as a bi-gram, which gives the probability of seeing each word, given the previous word; or a null-grammar, in which every word is equally likely to occur.

DECIPHER™ is SRI's large-vocabular speaker-independent continuous-speech recognition (CSR) system, which SRI has used for a number of different CSR tasks, including Resource Management (RM), Air Travel Information Systems (ATIS), and Wall Street Journal (WSJ) dictation [References 1–4].

According to the invention, a new scoring metric is implemented in a confidence score computer 30 which receives as input possible word sequences W (represented by path 16) and likelihood scores for each sequence W (represented by path 18) and provides as output the confidence score as hereinafter explained, the word itself and a time stamp (as represented by path 32) to an application. This new metric is generated by the process of summing over the N-Best word sequences W where the keyword is a member, and for each of those word sequences compute the probability of that word sequence W, given the observations. This value is normalized by the sum of N-Best word sequences, whether or not the keyword is contained in the word sequence, given the observations. This process is an implementation of the expression for the confidence score of the keyword, which is:

$$\frac{\sum_{W:(KW \in w_i)} P(\{w_1, \ldots, w_n\}|Obs)}{\sum_W P(\{w_1, \ldots, w_n\}|Obs)}$$

where:

W is all N-Best word sequences: $\{w_1, \ldots, w_n\}$

W: $(KW \in w_n)$ is all N-Best word sequences that contain the keyword KW.

Thus, for a given set of observations and a set of hidden Markov model-type recognition models, it is then possible to determine a probability distribution over the N-best word sequences. The ratio of the likelihood in the numerator and the likelihood in the denominator is the probability that the the keyword has appeared given the observations under the underlying model. For example, if a keyword appears in all likely word sequences, then confidence score would be 1.0. The equivalent log of the probability ratio is 0.0. The LVCSR log-likelihood ratio of the literature is the logarithm of the keyword confidence score.

The process according to the foregoing expression will hypothesize a keyword whenever the keyword appears in any word sequences in the N-Best list. Hypothesizing a keyword is the process of declaring that the keyword is detected.

The above discussion of the equation was in context of N-Best lists [References 9, 10]. That discussion is a special case of the more general meaning of the equation in which:

W is all word sequence: $\{w_1, \ldots, w_n\}$

W: $(KW \in w_i)$ is all word sequences $\{w_1, \ldots, w_n\}$ that contain the keyword KW.

For a given set of observations (Obs) and a set of HMM recognition models, a probability distribution can be computed over all word sequences. The numerator is the sum of the probabilities of all such word sequences that contain the keyword, while the denominator is the sum of the probabilities of all word sequences.

The ratio of these two quantities is the probability of all recognition hypotheses (weighted by the probability of different sequences) in which the keyword appears. If a keyword appears in all likely word sequences, then it will have a LVCSR log-likelihood ratio score of 0.0 (equivalent to the log of the probability ratio of 1.0).

A keyword would be hypothesized whenever there is a non-zero probability of a word sequence that contains the keyword.

In order to implement the process according to the invention, N-Best lists are employed. The N-Best lists correspond to the word sequences W that are searched for the keyword and which explain a given set of observations. (The series of hypotheses that explain the data are mutually exclusive.) The top "N" hypothesized sequences, representing the "N" best answers, comprise the list. The N-Best lists are computed using known progressive search approaches wherein an initial two-pass recognition system is used to generate word-lattices and a subsequent two-pass approach uses the word-lattices to prune the search while generating the N-Best lists and their likelihood scores for each word sequence [Reference 2].

The probabilities of the acoustic component and the language component, and any other information source, are summed to build the score. Specifically, if a keyword appears anywhere in the N-Best list, then the keyword is hypothesized with a score computed as follows:

$$\frac{\sum\limits_{W:(KW \in NB_i)} P(W) \cdot P(Obs|W)}{\sum\limits_{W} P(W) \cdot P(Obs|W)}$$

where:

P (Obs|W) is the acoustic HMM probability

P (W) is the language model probability

W: (KW∈NB$_i$) is the list of all N-Best word sequences that contain the keyword.

The numerator is the sum over word sequences containing a keyword of the acoustic likelihood of the word sequence given the observations given the keyword vector times the language likelihood of the word sequence, and the denominator is the normalization of that sum over all N-Best word sequences. (This is based on Bayes' Rule.) The foregoing equation substitutes for the previous general scoring metric.

The invention can be improved further by resolving special cases, such as the N-Best recognition hypotheses where a word can appear multiple times. Each N-Best hypothesis must contain timing information from the Viterbi backtrace to allow for this condition. This timing information allows the recognition system to treat each occurrence of the same keyword in a single recognition hypothesis as a separate instance of a keyword hypothesis. In the case where two keyword hypotheses from different N-Best recognition hypotheses overlap in time as indicated by the timing marks, then they are considered to by the same keyword hypothesis. Finally, as an N-Best list of hypotheses is processed in order, the time alignment for a particular keyword hypothesis always uses the time alignment from the N-Best hypothesis that has the highest acoustic likelihood per frame score of the keyword.

In the event of ties, the implementation of the foregoing equation accommodates tie-breaking by providing an ∈ multiplied by the acoustic likelihood per frame, to add this quantity to the score of the foregoing equation in accordance with the process of the invention. This allows the system to break ties when a score of 0.0 (log (1.0)) is produced if the keyword appears in all N-Best lists. A tie refers to a same confidence score's being computed for two separate utterances (i.e., observations), and/or two separate keywords. It is desirable to break ties, for example, when evaluating a system, so that the scores for false-alarms and true-hits can be compared.

While the absolute results depend upon the quality of the recognition model, the results are improved by using the present invention to score the keywords. In a previous approach having 70% recognition accuracy, the present invention improves recognition accuracy to better than 81%. Better models are needed to further improve recognition, but the scoring method according to the invention may continue to be used effectively.

In an alternative embodiment of the invention, there is an option for normalizing the confidence score. The confidence score can for example also be normalized by summing the terms in the denominator of the second equation over all N-Best sequences that do not contain the keyword. In this case, the confidence score is not a probability. Rather, it is a likelihood ratio.

In an embodiment of the apparatus of FIG. 1, the speech recognition system uses a vocabulary size of 5000 words which included all the keywords. A bigram grammar is used as well as genonic HMM acoustic models [Reference 1]. The size of the N-best lists used is 500. The two-pass system that generates lattices uses a lexical-tree for the back-off node [Reference 12].

Experiments were performed using this system, as described in [Reference 13], a copy of which reference was filed (on Jun. 21, 1995) with the priority provisional patent application (S/N 60/000,379) to the U.S. Patent and Trademark Office. In these experiments, results were evaluated using a Figure of Merit (FOM) that is an average probability of detection, averaged from 0 to 10 false alarms per keyword per hour (FA/KW/HR). Results were also plotted using an ROC curve in which the probability of detection is plotted as a function of the number of false alarms.

In these experiments, an embodiment of the present invention was compared to several other approaches, using the credit card subset of the Switchboard corpus [Reference 11].

Using the inventor's previously developed Viterbi 1-best path algorithm [Reference 8], a FOM of 69.7% was achieved. The limiting factor in this approach is that it does not hypothesize enough false alarms.

The Viterbi 1-best approach can be extended to hypothesize a keyword any time the keyword appears in an N-best list. The score of this keyword is the best probability-per-frame score of any hypothesis in any of the N-best lists. As the very poor performance (41.5% FOM) of this algorithm shows, many false alarms that appear in other locations in the N-best list will have a good score (probability per frame), even though the overall recognition hypothesis that this keyword appears receives a very poor score.

The embodiment of the present invention achieved an improved detection rate at high false alarm rates, while maintaining an even higher average probability of detection (FOM of 81%).

One of the factors that has led to the improved performance achieved by the present invention is the incorporation of additional knowledge (language modeling) in an LVCSR framework. The experimental results used a bigram language model trained on 2 million words of conversational speech.

The N-best implementation is straightforward and has the advantages that additional knowledge sources can be easily incorporated into the scoring algorithm (e.g. word and phone duration modeling, N-gram language models). However, the inventor has found that for conversations speech (with a high word-error rate), there are significant numbers of times when the correct word does not appear in the N-best list. For applications that require high probability of detection with corresponding high false-alarm rates, a direct search of a word-lattice [Reference 2] might lead to a better implementation of the above algorithm.

The invention has now been explained with reference to specific embodiments. Other embodiments will be apparent to those of ordinary skill in the art. It is therefore not intended that this invention be limited, except as indicated by the appended claims.

What is claimed is:

1. In a computerized speech recognition system, an improvement in a method for determining confidence of an occurrence of a keyword in a spoken utterance forming word sequences, the method including the steps of obtaining a time series of observation feature vectors representing the spoken utterance, said time series being formed from a representation of acoustic speech input, and determining possible word sequences and corresponding likelihood scores for each of said possible word sequences for said observations the improvement comprising:

computing for an application a confidence score for said keyword from probabilities that said keyword is in a sequence of words given said observation feature vectors, wherein said confidence score is computed as a summation over the word sequences containing the keyword of the product of the likelihood of the word sequence and the likelihood of the observations given the word sequence;

comparing said confidence score to a threshold; and declaring detection of said keyword in said spoken utterance if said confidence score exceeds said threshold.

2. In the method used in the speech recognition system according to claim 1 further comprising using all said corresponding likelihood scores for normalizing the confidence score of said keyword.

3. In the method used in the speech recognition system according to claim 1 further comprising hypothesizing said keyword upon appearance of said keyword in any of said possible word sequences.

4. In the method used in the speech recognition system according to claim 1, further comprising adding an $\in$ multiplied by the acoustic likelihood per frame of said keyword, to provide a mechanism for breaking ties in confidence score.

5. In the method used in the speech recognition according to claim 1, wherein said confidence score is computed according to the expression:

$$\frac{\sum_{W:(KW \in NB_i)} P(W) \cdot P(Obs|W)}{\sum_{W} P(W) \cdot P(Obs|W)}$$

where:

P (Obs|W) is the acoustic HMM probability

P (W) is the language model probability

W: (KW$\in$NB$_i$) is the list of all N-Best word sequences that contain the keyword.

6. In the method used in the speech recognition system according to claim 1 further comprising using all said corresponding likelihood scores for normalizing the confidence score of said keyword.

7. In the method used in the speech recognition system according to claim 6 further comprising using said corresponding likelihood scores from sequences not containing said keyword for normalizing the confidence of occurrence of said keyword.

8. In the method used in the speech recognition system according to claim 1 wherein each hypothesis contains timing information to allow identification of multiple occurrences of said keyword in said sequences, further comprising treating each occurrence of the same keyword in a single recognition hypotheses as a separate instance of a keyword hypothesis.

9. In the method used in the speech recognition system according to claim 1 wherein each hypothesis contains timing information to allow identification of multiple occurrences of said keyword in said sequences, further comprising treating each occurrence of the same keyword in a single recognition hypotheses as a separate instance of a keyword hypothesis.

10. In the method used in the speech recognition system according to claim 1 wherein each hypothesis contains timing information to allow identification of multiple occurrences of said keyword in said sequences, further comprising treating occurrences of said keyword in multiple recognition hypotheses, where said recognition hypotheses overlap in time as indicated by said timing information, as the same keyword hypothesis.

11. In the method used in the speech recognition system according to claim 10, further comprising computing time of occurrence of said keyword using time alignments from said one word sequence having highest acoustic likelihood per frame score of said keyword.

12. A computerized keyword spotting system comprising:

a word sequence search engine coupled to receive observations extracted from a speech signal, the search engine configured to produce at least one possible word sequence explaining said observations and a likelihood score corresponding to each of said possible word sequences; and a confidence score computer coupled to said word sequence search engine configured to generate a confidence score from probabilities that said keyword is in said sequences of words given said observations, wherein said confidence score computer produces said confidence score according to the expression:

$$\frac{\sum_{W:(KW \in W)} P(W) \cdot P(Obs|W)}{\text{NormalizingFactor}}$$

where:

P (Obs|W) is the acoustic HMM probability

P (W) is the language model probability

W: (KW$\in$W) is the list of word sequences that contain the keyword.

13. The keyword spotting system according to claim 12, wherein NormalizingFactor is the expression:

$$\sum_{W} P(W) \cdot P(Obs|W).$$

14. The keyword spotting system according to claim 12, wherein NormalizingFactor is a numerical constant.

* * * * *